(12) United States Patent
Wood et al.

(10) Patent No.: US 11,425,172 B2
(45) Date of Patent: Aug. 23, 2022

(54) APPLICATION SECURITY FOR SERVICE PROVIDER NETWORKS

(71) Applicant: T-Mobile USA, Inc., Bellevue, WA (US)

(72) Inventors: Keith Wood, Black Diamond, WA (US); Alain Soleil, Bellevue, WA (US); Michael Joseph Von Wald, Woodinville, WA (US)

(73) Assignee: T-Mobile USA, Inc., Bellevue, WA (US)

(*) Notice: Subject to any disclaimer, the term of this patent is extended or adjusted under 35 U.S.C. 154(b) by 269 days.

(21) Appl. No.: 16/879,356

(22) Filed: May 20, 2020

(65) Prior Publication Data
US 2021/0367975 A1  Nov. 25, 2021

(51) Int. Cl.
*H04L 9/40* (2022.01)
*H04L 41/082* (2022.01)
*G06F 3/0484* (2022.01)

(52) U.S. Cl.
CPC ............ *H04L 63/20* (2013.01); *H04L 41/082* (2013.01); *G06F 3/0484* (2013.01)

(58) Field of Classification Search
CPC ... H04L 63/20; H04L 41/082; H04L 41/5048; H04L 41/5051; H04L 41/5054; G06F 3/0484; H04W 12/30
See application file for complete search history.

(56) References Cited

U.S. PATENT DOCUMENTS

| | | | |
|---|---|---|---|
| 11,297,085 B2* | 4/2022 | Albero | H04L 63/1433 |
| 2008/0229381 A1* | 9/2008 | Sikka | H04L 63/20 726/1 |
| 2015/0347746 A1* | 12/2015 | Martel | G06F 21/6218 726/1 |
| 2018/0191682 A1* | 7/2018 | Liu | G06F 9/45558 |
| 2019/0089740 A1* | 3/2019 | Hastings | H04L 63/20 |
| 2020/0014734 A1* | 1/2020 | Cetin | H04W 12/12 |
| 2020/0050752 A1* | 2/2020 | Bender | G06F 8/60 |
| 2021/0385189 A1* | 12/2021 | Saghir | H04L 9/3268 |

* cited by examiner

*Primary Examiner* — Beemnet W Dada
(74) *Attorney, Agent, or Firm* — Lee & Hayes, P.C.

(57) ABSTRACT

Systems, methods, and apparatuses may include a network onboarding manager for configuring network security features at application hosting sites of a service provider network, for instance, as part of a procedure for deploying an application onto the service provider network. The network onboarding manager may generate a security profile for the application. The security profile may include information indicating a security posture of the application with respect to network security features needed to deploy the application, which the system may use to generate and send configuration data to the hosting sites. One or more operations may be performed based on a user input received at a developer portal (e.g., via a user interface), or automatically based on one or more API calls made by the network onboarding manager and/or based on one or more security profile templates.

20 Claims, 5 Drawing Sheets

APPLICATION SECURITY FOR SERVICE PROVIDER NETWORKS

BACKGROUND

Service providers operating 3rd Generation Partnership Program (3GPP) networks typically host applications on the network at multiple hosting sites in multiple regions throughout the world. As service providers update their networks through various iterations (e.g., 3G, 4G, and LTE), add inter-operability with other service provider networks, and add new services, network security features are not uniformly layered throughout the networks. Each particular set of network security features provided at each hosting site may be unique. As such, deploying applications on the network may require weeks, or even months, of cumbersome processes for each set of network security features to be configured at each hosting site.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Systems, methods, and apparatuses (hereinafter the "system") disclosed herein may include a network onboarding manager for configuring network security features at application hosting sites of a service provider network, for instance, as part of a procedure for deploying an application at the hosting sites. The network onboarding manager may generate a security profile for the application. The security profile may include information indicating a security posture of the application with respect to network security features needed to deploy the application. The security profile may contain configuration data particularized to the hosting sites and, as such, the system may deploy the security profile to the hosting sites to configure the hosting sites. One or more operations may be performed based on a user input received at a developer portal, or automatically based on one or more API calls made by the network onboarding manager.

In some examples, the system may provide flexible security controls that fulfill the application security posture. The network onboarding manager may act as an automated configuration service or orchestration tool to configure the network security features in the flow of the application's deployment onto the service provider network.

In some embodiments, the system may reduce time and manual labor requirements for security configurations of new application deployments. The system may store a single authoritative record of the security profiles indicating the security postures of each application deployed on the service provider network because it may be self-documenting end-to-end. The system may ensure deployment consistency for each instance of the application, reduce fault domain and impacts from outages or upgrades, and streamline a network security onboarding process for the application. In some instances, the system may provide a developer tool such as a developer portal that may provide a single view of application network security configuration and posture. An additional layer of security control may be provided by API controls, which may be layered onto existing network infrastructure to increase usage and efficiencies via higher usage capacity ratios. Moreover, in some examples, the system may integrate Standards Compliance and Security Compliance into hosting site configurations and application deployment.

Figure 1:
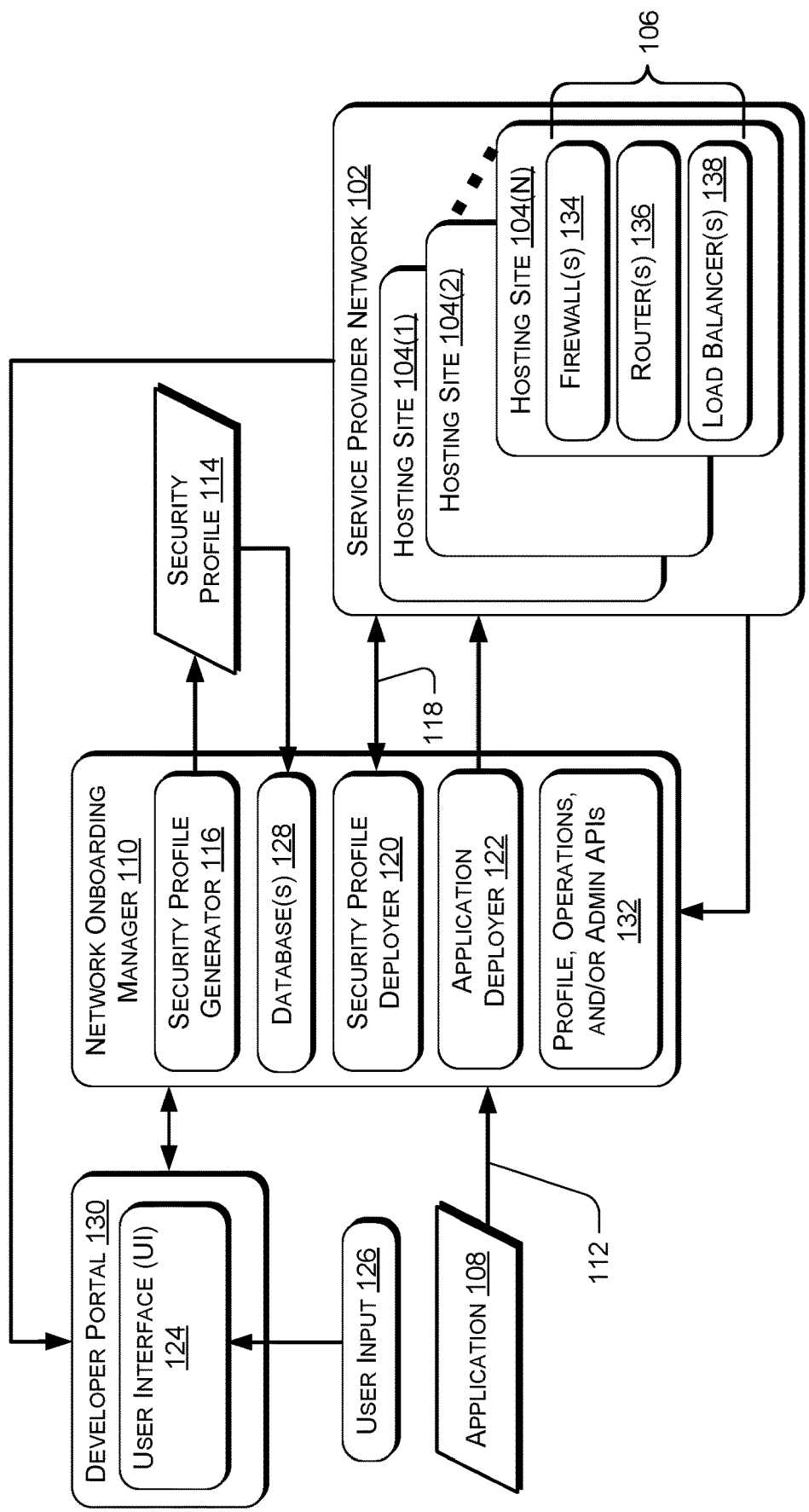
FIG. 1 depicts a schematic diagram of example system(s) for configuring network security features at one or more hosting sites based on a security profile of an application.

FIG. 1 depicts an example system 100 including a service provider network 102 and one or more hosting sites 104(1), 104(2) . . . 104(N) providing (or otherwise associated with) one or more network security features 106 for securely hosting an application 108 on the service provider network 102. The system 100 may comprise a network onboarding manager 110 for receiving application data 112 associated with the application 108, generating a security profile 114 (e.g., via a security profile generator 116) representing a security posture of the application 108 with respect to the one or more network features 106, deploying the security profile 114 (which may contain configuration data 118) via a security profile deployer 120) based at least in part on security profile data that may be included in the application data 112, and deploying the application 108 at the one or more hosting sites 104(N) (e.g., via an application deployer 122). The system 100 may include a user interface (UI) 124 for receiving a user input 126 providing information for generating the security profile 114. The security profile 114 may be stored in one or more database(s) 128. In some examples, the system 100 may provide the UI 124, receive the user input 126, and/or perform other operations via a developer portal 130. One or more profile, operations, and/or administrative Application Programming Interfaces (API)s 132 may send and or receive messages for performing the operations discussed herein.

In some embodiments, the service provider network 102 may comprise one or more wired or wireless telecommunications networks, data networks, or cloud-service networks. For instance, the service provider network 102 may comprise a 3rd Generation Partnership Project (3GPP) network, such as a 3G network, a 4G network, a 4G Long Term Evolution (LTE) network, an LTE Advanced network, a 5G network, an evolved IP Multimedia System (IMS) network, or combinations thereof.

In some instances, the service provider network 102 (or any systems discussed, servers, or computing devices which may execute the network onboarding manager 110 and/or the developer portal 130 or other components discussed herein) may comprise one or more computer-readable storage media. The one or more computer-readable storage media may be distributed throughout the service provider network 102 at multiple network nodes, functions, servers, and/or databases 128 (e.g., at multiple geographic regions or within a single geographic region), or the computer-readable storage may be located at a single network node, server, and/or databases 128.

In some embodiments, the computer-readable storage media may comprise non-transitory and may include phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, combinations thereof, or any other non-transitory medium that can be used to store information for access by an electronic computing device. Databases 128 discussed herein, for instance stored at computer-readable storage media, may include one or more of a comma delimited list, a spreadsheet, an array, a NoSQL data structure, a hash-based data structure, an object-based data structure, or any other data type, data structure, and/or data system for storing retrievable data.

In some examples, the service provider network 102 may comprise one or more processors. The one or more processors may be distributed throughout the service provider network 102 at multiple network nodes, functions, servers, and/or databases 128 (e.g., at multiple geographic regions or within a single geographic region), or the one or more processors may be located at a single network node, server, and/or database. The one or more processors may comprise one or more of a microprocessor, a microcomputer, a microcontroller, a digital signal processor, a central processing unit (CPU), a graphics processing unit (GPU), combinations thereof, etc. Among other capabilities, the one or more processor(s) may operate to fetch and execute computer-readable instructions (e.g., object code) stored in the one or more computer-readable storage media device(s) to perform the operations disclosed herein.

In some embodiments, the system 100 may comprise the one or more hosting sites 104(N). The one or more hosting sites 104(N) may comprise network node(s) for hosting the application 108, such as a Global Traffic Manager (GTM). The one or more hosting sites 104(N) may be associated with one or more hosting site identifiers (e.g., hosting site identifiers 214 discussed with regard to FIG. 2) such as FWEP, FWET, LBEP, LBET, svrp01, svrp02, svrpt01, svrt02. The one or more hosting sites 104(N) may provide a security platform including the one or more network security features 106 which, in some examples, are configured as part of a deployment process for hosting the application 108. A first hosting site 104(1) may comprise first one or more security network features 106 and a second hosting site 104(1) may comprise second one or more security network features 106 which may comprise a different set of network security features 106 than the first one or more network security features 106. For instance, the first one or more network security features 106 may comprise one or more of: firewall(s) 134; router(s) 136; load balancing system (LBaaS) (e.g., load balancer(s) 138); a domain name system; a dynamic host configuration protocol; an internet protocol address management system; a hypervisor; or a virtual local area network. The second one or more network security features 106 may comprise a different or same one or more of the network security features as the first network security features 106.

In some examples, the system 100 may comprise the network onboarding manager 110. The network onboarding manager 110 may comprise a Secure Network Onboarding/Consolidated Application Profiling (SNO/CAP) solution that creates, stores, tracks, deploys, and/or otherwise manages the security profile 114 associated with the application 108, and/or a plurality of security profiles 114 associated with a plurality of applications 108. The network onboarding manager 110 may generate the security profile 114 and/or deploy the application 108, based at least in part on the security profile 114, at the one or more hosting sites 104(N) via the one or more profile, operations, and/or administrative APIs 132 and/or the UI 124 as discussed in greater detail below.

In some embodiments, the network onboarding manager 110 may comprise the security profile generator 116 for generating the security profile 114. The security profile generator 116 may, in some instances, comprise a NetBrain system (e.g., ServiceNow) which may act as a source of truth for Application (Business Service) data and Server (e.g. Continuous Integration server) data used to generate the security profile 114. For instance, the NetBrain system may act as the source of truth for network topology and traffic path data of the application 108, which may be used to identify the one or more hosting sites 104(N), the one or more network security features 106, and/or generate the security profile 114. As such, the security profile 114 may represent a security posture of the application 108 with respect to the one or more network security resources 106. For instance, the security profile 114 may indicate one more security characteristics of the application 108 that require a corresponding configuration at the one or more hosting sites 104(N) in order to deploy the application 108 on the service provider network 102. The security profile 114 is discussed in greater detail below regarding FIG. 2. The UI 124 for receiving data (e.g., via the user input 126 or other sources) on which the security profile 114 may be based is discussed in greater detail below regarding FIG. 3.

In some examples, the system 100 may comprise the security profile deployer 120 for deploying the security profile 114, which includes the configuration data 118, to the one or more hosting sites 104(N). The security profile deployer 120 may receive information from the security profile 114, such as information indicating the security posture of the application 108, the one or more hosting site identifiers 214 that correspond to the one or more hosting sites 104(N), and/or other information indicating the network security features 106 relevant to providing security for the application 108, and that may require configuring during deployment of the application 108. The security profile deployer 120 may generate the configuration data 118, which may be particularized to the one or more network security features 106 at the one or more hosting sites 104(N) at which the application 108 is to be deployed. The configuration data 118 may provide one or more API commands that fulfill an open or undetermined parameter value or setting at the one or more hosting sites 104(N), such as a Polaris DC configuration or a Titan DC configuration. The parameter value or setting may include one or more of a source type identifier (which may indicate a subnet source type, like "care," "retail," or "admin," etc.), a destination VIP value (e.g., 10.x.x.x), a port number (e.g., "323,8888"), a service group value (e.g., "svrp01" or "svrp02"), a health monitor call (e.g., https.get), activation of a Hypervisor control system, a host control system in a virtual environment, and/or tooling to create a host IP Table.

In some examples, the configuration data 118 may include designated values (e.g., alphanumeric values, binary values indicating an on or off, or "yes" or "no," etc.) for the parameter values or settings of the security network features 106 and may cause the parameter values or settings to be changed according to the requirements of the security profile 114 to configure the network security features 106 at the one or more hosting sites 104(N). Configuring the network security features 106 according to the configuration data 118 may result in deploying the application 108 at the one or more hosting sites 104(N) more quickly and automatically (e.g., omitting manual steps of deployment requiring additional user input) because instances of the application may be sent to dozens, hundreds, or even thousands of different hosting sites 104 with different network security settings 106, for instance, based on API commands of the one or more one or more profile, operations, and/or administrative APIs 132.

In some examples, the network onboarding manager 110 may include database(s) 128. Database(s) 128 may comprise one or more of a system settings database, a role data database, a security profile database, a versions database, a queued data database, a metrics/mapping database, and/or a decisions and rules database.

In some embodiments, the network onboarding manager 110 may be hosted by a hosting platform such as an Itential Automation Platform (TAP) system. The TAP system may host the one or more profile, operations, and/or administrative APIs 132, the developer portal 130 (e.g., the UI 124) and any other associated or interrelated workflow operations of or associated with the network onboarding manager 110. The TAP system may provide authentication, role-based security, high availability, process management, logging, and other associated functionality.

In some examples, the network onboarding manager 110 may comprise a Pier Simplified Change system to act as a change control source of truth (e.g., state information tracker). The Pier Simplified Change system may record any network or device changes related to deployment/execution of the security profile 114, the configuration data 118, and/or the application 108 itself.

In some embodiments, the network onboarding manager 110 may comprise a load balancer automator. The load balance automator may communicate with and/or manage active load balancers (e.g., A10 load balancers such as the load balancer(s) 138) at the one or more hosting sites 104(N), for instance, to configure the load balancer(s) 138 according to the configuration data 118.

In some examples, the network onboarding manager 110 may comprise a Domain Name System (DNS) automator. The DNS automator may create, manage, and/or remove various DNS record types, for instance, within a backend Infoblox DNS, Dynamic Host Configuration Protocol (DHCP), and Internet Protocol Address Management (IPAM) (DDI) Management system. The DNS Automator may abstract the Infoblox DDI system by providing the UI 124 and/or an API layer provided by the one or more profile, operations, and/or administrative APIs 132 and may integrate with the Pier Simplified Change system for operational change control processes.

In some embodiments, the network onboarding manager 110 may comprise an IPAM automator. The IPAM automator may create, manage, and/or remove IPAM records within the backend Infoblox DDI Manager system. The IPAM automator may abstract the Infoblox DDI system by providing the UI 124 and/or the API layer and may integrate with the Pier Simplified Change system for operational change control processes.

In some examples, the network onboarding manager 110 may comprise a firewall automator. The firewall automator may receive submissions of traffic flow queries (Policy Check), submissions of traffic flow requests (Policy Change), request queueing, and/or application group membership management via the API layer and/or the UI 124, one or more of which may be associated with the application 108. The firewall automator may integrate with a backend firewall management and security analysis platform (e.g., Checkpoint, Algosec, etc.), and/or may integrate with the Pier Simplified Change system for change control.

In some embodiments, the network onboarding manager 110 may comprise the database(s) 128, such as a MongoDB system. The database(s) (e.g., the MongoDB system and/or other database systems) may comprise a secure, high-availability, document database system and may provide a data storage layer for the IAP system, IAP system workflows, and solutions hosted by the IAP system. In some examples, the security profile 114 may be stored in document collections within instances of the database(s) 128 (e.g., one or more MongoDB instances), as well as, application specific settings, metrics data, and/or the configuration data 118.

In some examples, the network onboarding manager 110 may determine and/or store indications of related network devices. The related network devices may comprise any device in a communications path of the application 108 that may be affected by creation of or changes to the application 108.

In some embodiments, the network onboarding manager 110 may comprise one or more systems (e.g., which may be accessible or initiated via the UI 124) for storing and/or retrieving the security profile 114, viewing and/or editing the security profile 114, archiving the security profile 114 (e.g., in a profile database), generating reports and usage statistics describing activity associated with the security profile 114, and/or a role-based security model for managing access to a feature or operation of the security profile 114.

In some embodiments, the network onboarding manager 110 may comprise a Service Oriented Architecture (SOA) system with most functionality available via the one or more profile, operations, and/or administrative APIs 132. Secure API endpoints may be available through the application 108 hosted in the IAP system. The IAP may provide HTTPS communication, multi-factor authentication, as well as, group and role-based permissions. In addition to those accessing the UI 124, other API consumers may be granted data access via a permissions and authentications systems.

Figure 2:
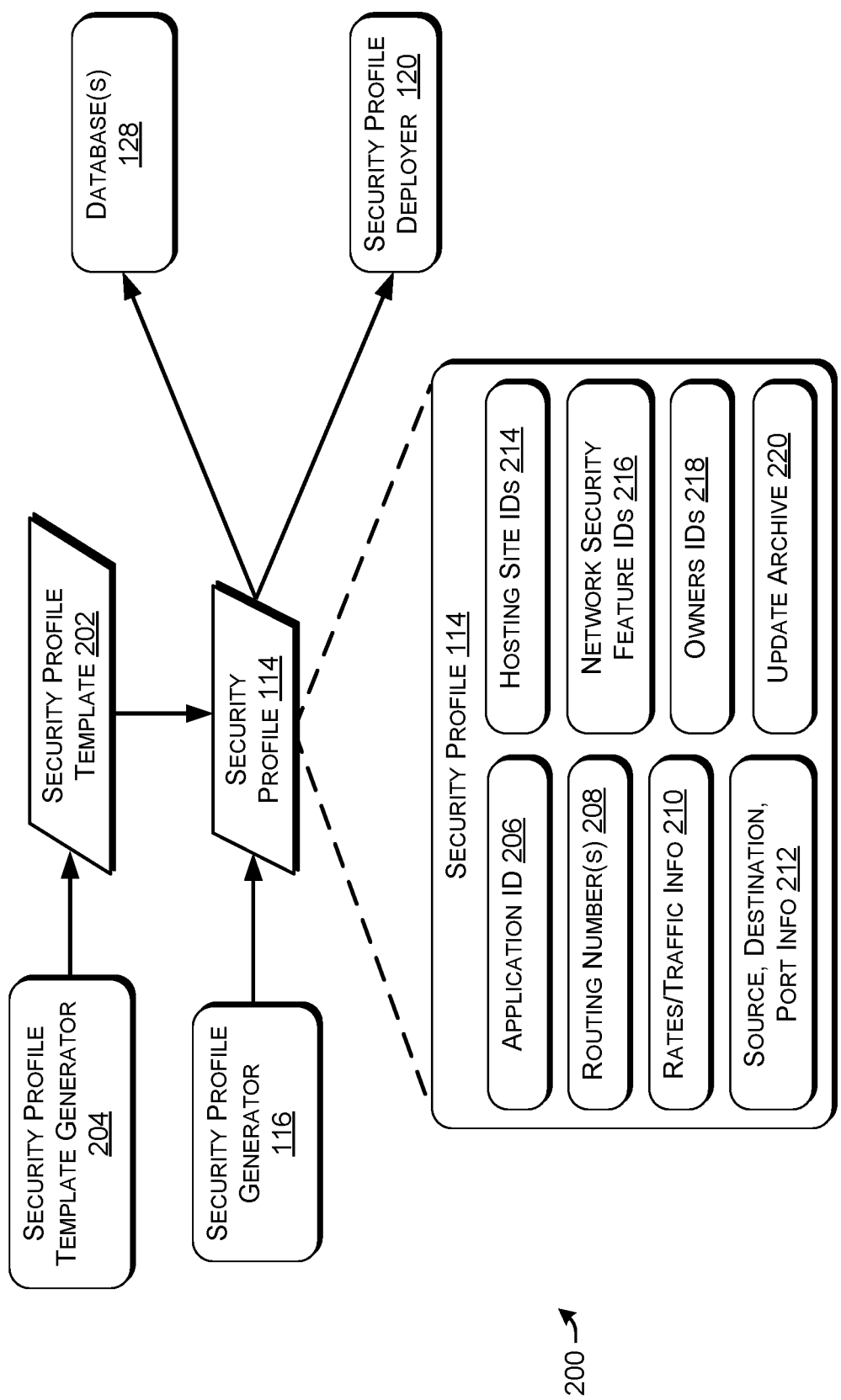
FIG. 2 depicts a schematic diagram of the example security profile of the application, which may form at least a portion of the system(s) discussed herein.

FIG. 2 depicts an example system 200 (which may be similar to, identical to, or form a portion of any systems discussed herein) including the security profile 114. The security profile 114 may be generated by the security profile generator 116 and/or may be based on a security profile template 202 (which may be generated by a security profile template generator 204).

In some examples, the security profile 114 may define and/or indicate information about the application 108 that may be necessary, helpful, relevant, or otherwise used for configuration of component systems that support deployment and continuing operation of the application 108 on the service provider network 102 (e.g., the security network features 106). The security profile 114 may contain metadata information about the application 108 itself, such as, an application identifier 206; routing number(s) 208; rates and traffic information 210; source, destination, and port info 212; hosting site identifiers 214; network security feature identifier(s) 216; owner identifier(s) 218; an update archive 220; network security feature owner information; group contact information; creation data (e.g., date, time, location, author, etc.); status data; activity data; and/or change record data. The security profile 114 may contain information related to associated components of the application 108 as a deployed network solution. Associated component data may comprise information relating to systems of record of the network security features 106, such as ServiceNow, NetBrain, DNS, DHCP, IPAM (DDI) systems, as well as, virtual or physical network infrastructure that provide load balancing, VLAN, firewall(s) 138, Hypervisor, and/or other components of the network security features 106. In some instances, the security profile 114 may include network-related information (e.g., technical information about network operations/performance) and/or other information, such as location information associated with a user device (e.g., geo-fence data), location-based service information for a service executing at the user device, subscriber profile information (device identifiers associated with the subscriber profile, a user name), a Mobile Station International Subscriber Directory Number (MSISDN), and/or network latency or delay information.

In some embodiments, the security profile 114 may be based at least in part on security profile data which may be included in the application data 112 and/or may be provided from other sources (e.g., other nodes of the service provider network 102). In some instances, the security profile 114 may be based on the user input 126 received at the UI 124 as described in greater detail below. For instance, the security profile generator 116 may comprise a portion of or otherwise be in communication with the developer portal 130 providing the UI 124.

In some examples, the security profile 114 may be based on the security profile template 202. The security profile template 202 may include data comprising a predetermined format, predetermined data fields, and/or predetermined values of the predetermined data fields. The security profile template 202 may be generated by the security profile template generator 204 based on the user input 126 at the UI 124 and/or the one or more profile, operations, and/or administrative APIs 132. In some instances, there may be one or more types of security profile template 202 that correspond to different functions or types of applications 108 and/or different regions or types of hosting sites 104. The security profile template 202 may further automate one or more of the steps for generating the security profile 114.

Figure 3:
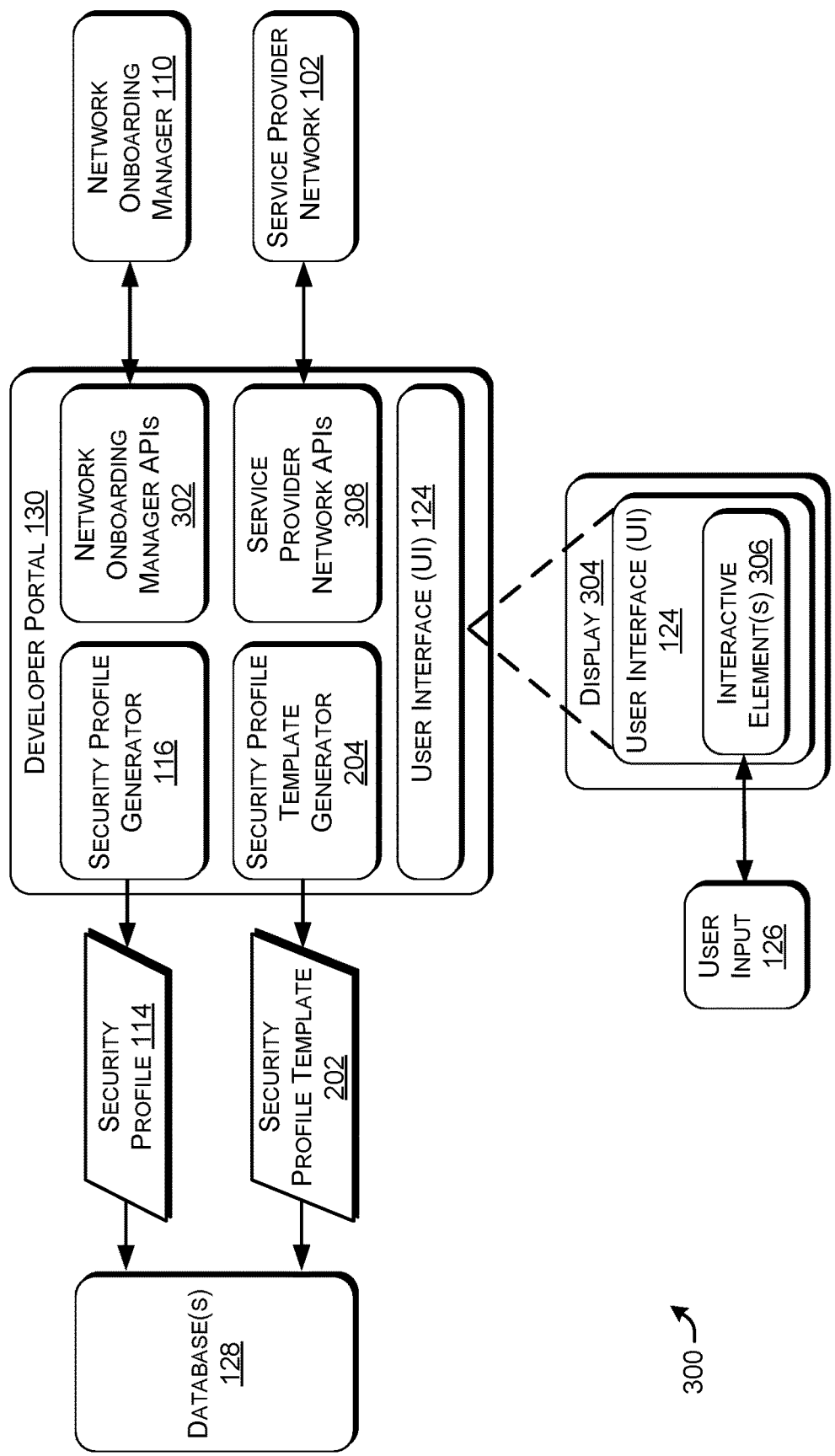
FIG. 3 depicts a schematic diagram of an example developer portal, which may form at least a portion of the system(s) discussed herein.

FIG. 3 depicts an example system 300 (which may be similar to, identical to, or form a portion of any systems discussed herein) including the UI 124 of the developer portal 130, the security profile generator 116, the security profile template generator 204 for generating the security profile template 202, and other components for generating the security profile 114 and/or the security profile template 202.

In some examples, the UI 124 may be hosted within the IAP system, for instance, as a unique application, and may be a primary consumer of network onboarding manager APIs 302 for communicating with the network onboarding manager (e.g., via the profile, operations, and/or administrative APIs 132. The UI 124 may leverage the authentication and group/role-based security model in place within the IAP system. A User Experience (UX) of the UI 124 may be consistent with other IAP hosted applications enabling quick adoption by end-users familiar with the IAP hosted applications. The UI 124 may be presented on a display 304 of a computing device, such as a visual display and/or a touchscreen. In some examples, the UI 124 may include an audio interface (e.g., a microphone and/or a speaker).

In some embodiments, the UI 124 may comprise a wizard-like process to enable users (e.g., application owners) to quickly enter and/or validate data needed for formation of the security profile 114 via one or more interactive element(s) 306. The one or more interactive element(s) 306 may comprise one or more of a graphic icon, a check-box, a string input field, a text box, a hyperlink, and the like. In some instances, the user input 126 may be received via an interaction with the interactive element(s) 306 (e.g., via contact with a touchscreen, selection with a cursor or mouse, a voice command, a command-line entry, a physical hand-motion, and/or a physical body-motion, etc.). The wizard-like process may guide the user by using an advanced decisioning engine that draws as much information as possible from systems of record, such that the UI 124 may require the user to manually enter only a minimal amount of information (e.g., less than five entry fields or less than ten entry fields), which may reduce a probability of data entry errors.

In some examples, upon receiving the user input 126, the system 300 (e.g., via the developer portal 130 and/or the network onboarding manager 110) may determine the network security features 106, which may comprise one or more of virtual network infrastructure components and/or physical network infrastructure components that provide load balancing and/or security, such as the VLAN, the firewall(s) 134, the Hypervisor, ServiceNow, NetBrain, DNS, DHCP, IPAM (DDI) systems. In some instances, the system 300 (e.g., the security profile generator 116 and/or the security profile template generator 204) may send one or more API discovery requests to the one or more hosting sites 104(N) to determine information about the one or more network security features 106 that may be used for generating the security profile 114, for instance via one or more service provider network APIs 308.

In some examples, the UI 124 may allow users to search for existing security profiles 114 and/or security profile templates 202, and may provide view, edit, removal operations for the security profile 114 and/or the security profile templates 202. Edit and removal operations may require specific role permissions in the application 108 in order to be performed. The UI 124 may provide administrative users the ability to manage data used within the application 108 for application functions, as well as, decision point data not stored in another system of record. The UI 124 may provide access to one or more administrative functions, such as reporting (e.g., on application 108 usage and/or usage of the network security features 106), role management, rule management, and/or setting management. In some instances, the UI 124 may provide the one or more interactive element(s) 306 for executing one or more security profile functions that create, edit, archive, list, search, clone, or generate multiple versions of the security profile 114. The UI 124 may present the interactive element(s) 306 for executing one or more operations functions, such as drafting, generating a work queue, deploying the application 108, and/or sending the configuration data 118 or staging. The UI 124 may present the interactive element(s) 306 for executing one or more administrative functions, such as a role management operation, a rule management operation, reporting operation, and/or a settings operation.

In some embodiments, the user input 126 may be received at the one or more interactive element(s) 306 of the UI 124 and may cause execution of creating a new security profile 114, editing the security profile 114, and/or selecting the security profile 114. In some examples, upon receiving the user input 126, the developer portal 130 may output the security profile 114 (e.g., the new security profile 114) and/or an update to the security profile 114.

In some example, the UI 124 may ask the user to provide the user input 126 indicating host names associated with the application 108. Action options presented by the UI 124 may include searching for valid host names from ServiceNow. The developer portal 130 may output a list of host names or the hosting site identifiers 214. Once the user provides host names or the hosting site identifiers 214, the system 300 may look up names in a Configuration Management Database (CMDB). The system 300 may try to fill out as many security profile questions as possible. If hosts are at a single site, the UI 124 may ask question about and/or receive the user input 126 indicating a multi-site redundancy requirement for the application 108. In some instances, types of services that the application 108 may require may include AD, ISE, Cloud (AWS), billing apps, retail apps, care apps. In some examples, the system 300 may determine one or more output destination IPs for these services (e.g., to generate the security profile 114 and/or the configuration data 118).

In some examples, the system 300 may connect and/or output premade labels to specific hosts (data may be pulled from ServiceNow), for instance, based on the user input 126.

In some examples, the system 300 may determine one or more types of users that may provide the user input 126, such as a retail user, a customer care user, an Engineer-in-Training (EIT) user, CoreNet Users (handset), VPN Users, VPN EIT, Vendors, Extranet partners. Data in the security profile 114 and/or the configuration data 118 may be based on the one or more types of users.

In some embodiments, the UI 124 may present a prompt requesting the user input 126 that indicates what address or URL(s) a client would use to access the application 108. The user may provide the user input 126 in response to this prompt. In some instances, the system 300 (e.g., the developer portal 130) may look up the URL if it is already in use, and the CMDB may include a host of the service provider as part of the application 108. The system 300 may search to find a certificate associated with the URL. The certificate may be delivered/installed where required for the application 108. If the URL is new, using https:, and no certificate has been created, the system 300 may order a new certificate and it may be delivered/installed where needed. The name/URL may provide information indicating the DNS needs. If the UI 124 does not receive the URL including http/https, the system 300 may create a new question asking if the web service should use secure communication or clear text and open communication. If another, second user input 126 indicates that the user requires a secure communication, the system 300 may create a certificate of secure use.

In some embodiments, the UI 124 may present a request for the user input 126 to indicate what are the specific or standard ports for the application 108. The UI 124 may present a list of common ports that meet the server type. If non-standard ports are used for the application 108 (e.g., absent from the list of common ports), the configuration and/or deployment may be flagged for follow up, for instance, by a design engineer.

In some examples, the developer portal 130 may provide a secure web portal that authenticates a user with Multi-Factor Authentication (MFA) and/or may use some kind of token (e.g., OAuth or Security Assertions Markup Language ((SAML)) The developer portal 130 may use Transport Layer Security (TLS) 1.2/1.3 with a 2k key using Elliptic-curve Diffie Hellman Encryption (ECDHE) or better. The UI 124 may present a user login screen that is secure and encrypted. Credentials may be secure, encrypted tokens, and MFA may be required for authentication and authorization.

In some examples, the UI 124 may present a section indicating currently owned security profiles, which may be visible upon login. The UI 124 may present one or more interactive element(s) 306 for selecting, editing, and/or modifying the security profile 114 and/or the security profile template 202. The UI 124 may present one or more interactive element(s) 306 for generating a report representing the security profile 114, deployment the application 108, and/or activity of the application 108 once deployed. The UI 124 may present one or more interactive element(s) 306 for initiating monitoring of activity of the application 108, for instance, activity related to a change in the security posture of the application 108.

In some examples, the UI 124 may receive the user input 126 to create, select, or edit the security profile template 202 (which may include any of the information that may be included in the security profile 114) which may be applied to the application 108 to generate the security profile 114. Upon receiving the user input 126 to create a new security profile template 202, the system 300 may validate an application name and/or the host names or hosting site identifiers 214 with the CMDB and pull back related information on those names/identifiers.

In some embodiments, once authenticated, the user may select to create a new security profile template 202 and/or security profile 114. The user may be prompted by a presentation of the UI 124 to enter a name of the application 108. In some instances, the system 300 may validate the application name in ServiceNow and may pull down all information the CMDB has for the application 108 based on the application name. If the application name is not found, the system 300 may prompt the user with an error and allow them to fix/edit their answers, and also may provide a link to create a new application in ServiceNow. If the application name is found, the system 300 may attempt to use data from ServiceNow to fill in as many fields of the security profile 114 as possible. Once verification of the application 108 is complete, the system 300 may create a list of fields that could not be answered by the CMDB. Once the list is created a set of corresponding questions may be presented to the user via the UI 124.

In some embodiments, the UI 124 may present the one or more interactive element(s) 306 for selecting to manually complete the security profile template 202 (e.g., via the user input 126), which may cause the system 300 to provide a blank template that the user can fill out with additional user inputs 126 absent additional assistance from the developer portal 130. For instance, the user may be presented with a blank security profile template 202 to fill out manually, and the system 300 may provide a link to user groups and their associated subnets as a reference to the user, but may not automatically make any selections for the user. The system 300 may verify that host names are real servers on the service provider network 102 and may verify that the servers are not associated with another template or application before allowing work to be sent to the scheduler.

In some examples, the information received in the user input 126 may be evaluated as it is submitted to the system 300 via the UI 124. If the user provides the system 300 with information that does not support the automated template creation or editing process, the system 300 may save the form in a draft format and provide assistance to the user by creating an intake request to get human help. Data submitted by the user may be saved to a temporary file. As the data is validated, if the system 300 determines that the security profile 114 or the security profile template 202 cannot be created without human help, a draft of the security profile 114 or the security profile template 202 may be saved and a ticket may be opened. In some instances, this may also occur in the case of a deployment error of any kind.

In some embodiments, the system 300 may cause the UI 124 to present the one or more interactive element(s) 306 for editing existing security profile templates 202. For instance, once authenticated (e.g., logged in), if the user has created security profile templates 202, the UI 124 may display a list of applications 108 owned by or otherwise associated with the user and/or teams or groups corresponding to the user. Upon receiving a selection to edit the security profile template 202, an edit screen may show a currently selected security profile template 202 along with the questions and answers provided during the creation stage. The user may update any answers or click to edit the security profile template 202 directly. Any changes to the security profile template 202 may show devices being changed in a device map and a device list of what is being changed. The UI 124 may present a confirmation (e.g., "Are you sure?" or "Does this look right?") and may receive a response to the confirmation from the user before the changes are sent to the scheduler. The system 300 may output and/or store data indicating a prior state and/or who made changes. In some instances, the system 300 may save an archive of changes to the security profile 114 and/or the security profile template 202 for up to 10, 20, 30, 60, or 100 changes, or changes occurring for 1 month, 2 months, 3 months, 4, months, 5, months, 6 months, a year, or multiple years.

In some embodiments, the UI 124 may present the one or more interactive element(s) 306 for, upon receiving the user input 126, managing and monitoring existing security profile templates. The UI 124 may present information showing statistics about traffic and performance of devices in the flow of the application 108 once deployed based on the security profile 114. The UI 124 may present information indicating where the application 108 lives in the network and/or a traffic split if it resides at more than one of the one or more hosting sites 104(N). The user may dynamically change those flows via interactions with the interactive element(s) 306. The user may view logs and put in trouble tickets and create additional instances for scaling needs based on interactions with the interactive element(s) 306. A manage and monitoring section of the UI 124 may include an event logs about the status of the application 108 and any changes being made to network devices or the one or more hosting sites 104(N) by the system 300. In some instances, the UI 124 may present or otherwise provide access to (e.g., via the one or more interactive element(s) 306) change logs, error logs, and monitor changes in real-time (e.g., within a millisecond or a few milliseconds, a second or a few seconds, or a minute or a few minutes of the changes occurring).

In some embodiments, the UI 124 may present information for the user to review and confirm before final creation of the security profile 114 and/or the security profile template 202. Once one or more predetermined template fields are filled in via the user input 126, the UI 124 may present a view of the security profile 114 and/or the security profile template 202, questions answered, and allow the user to edit the answers or choose an advanced option to modify the security profile 114 and/or the security profile template 202 directly.

In some examples, the UI 124 may present feedback on the security profile 114 and/or the security profile template 202, and creation of a policy, as the system 300 maps out the application 108 with respect to the one or more hosting sites 104(N). The UI 124 may display a network map and/or status associated with the security profile 114 and/or the security profile template 202. In some examples, the UI 124 may present a list of devices that are connected to each other and, as the developer portal 130 creates the list, it may indicate when one or more devices at the one or more hosting sites 104(N) on the map are ready for configuration and/or a current configuration status.

In some examples, the system 300 (e.g., the developer portal 130 and/or the network onboarding manager 110) may evaluate a submitted security profile 114 and/or security profile template 202 to decide if it meets logical criteria to become the security profile 114 and/or security profile template 202 for the service provider network 102. The system 300 may provide feedback of a success event or a failure event when the security profile 114 and/or security profile template 202 is verified and/or created. If the system 300 determines an occurrence of a failure event a draft of the security profile 114 and/or security profile template 202 may be saved, and a ticket for assistance may be generated and sent. Once the security profile 114 and/or security profile template 202 is completed, the system 300 may look up customers to host a network flow map associated with the security profile 114 and/or security profile template 202. In some examples, the system 300 may note the devices in the flow map and may select a particular load balancer and/or reserve a particular IP address, Virtual IP (VIP) address, and/or Secure Network Address Translation (SNAT) value. The system 300 may look up a customer to a VIP flow map, a host to support the flow map, and the support applications to the flow map using a ServiceNow API. The system 300 may create a list of devices that need to be changed/updated and what API calls are required for each device to make the requested changes/updates. Once this is complete, the system 300 may generate the list of devices and/or changes, which may be sent to the scheduler. The system 300 may generate, send, or execute one or more profile API commands (e.g., create, edit, archive, list, search, validate, and/or clone), operations API commands (e.g. deploy and/or stage), and/or administrative API commands (e.g., role management, rule management, reporting, and/or settings management), for instance, based on the list of devices and/or changes.

In some examples, the UI 124 may present feedback that the security profile 114 and/or the security profile template 202 is created successfully. In response to determining that the security profile 114 and/or the security profile template 202 is successfully created, the system 300 may send instructions to cause changes needed for each of the devices in the flow map to the scheduler (e.g., the configuration data 118). The scheduler may evaluate the devices and APIs needed by the security profile 114 and/or the security profile template 202. Based on the devices and APIs, the system 300 may determine scheduling options to complete the work needed to enact the requested changes. At that time of change the scheduler may, in some examples, pull real-time configuration statuses associated with one or more device(s) and/or each device in the flow map, and complete configuration changes of what is needed as compared to what has already occurred.

In some embodiments, the UI 124 may present a prompt for a list of deployment scheduling options. Once the system 300 has a list of all devices populated on the flow map, and each device is considered 'ready for deployment' (meaning a list of all API calls required to enforce a policy indicated by the security profile 114 and/or the security profile template 202 is ready), the UI 124 may present a list of scheduling options for deployment of the changes discussed above. The UI 124 may present an option to deploy all instances of the application 108 at once, and/or other options to deploy some instances substantially immediately while rolling out other instances over a series of hours or days, such as over the next 4, 8, 12, and 24 hours, 2 days or 3 days after receiving the user input 126 to initiate deployment. A deployment option may comprise deploying a first half of the instances during a next network change window and deploying a second half of the instances during a following network change window. Another option might be all changes during the next network change window, or any number of sequential or alternating network change windows.

In some examples, the UI 124 may present real-time feedback for one or more device(s) and/or each device at the one or more hosting sites 104(N) indicated by the flow map, and their statuses as changes are completed. As the scheduler executes operations discussed herein, notifications regarding the operations may be sent to the user via email. The system 300 may provide detailed feedback of who, what, where, when, and a comment field associated with the operations. As configuration changes are initiated and/or completed and the application 108 is deployed, a real-time map in a monitoring section of the UI 124, for instance, associated with the application 108 and/or the security profile 114, may present indicators representing the configuration changes.

Figure 4:
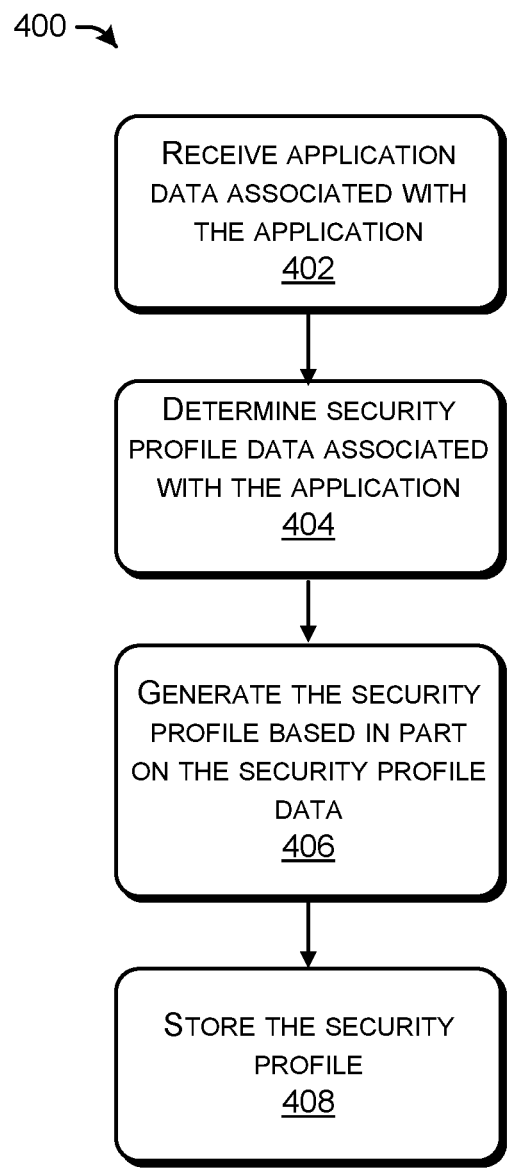
FIG. 4 depicts an example flow diagram illustrating a method for generating the security profile, which may be performed by the system(s) discussed herein.

FIG. 4 depicts an example method 400 that may be performed by any of the systems discussed herein, although system 100 is discussed by way example merely for convenience. The method 400 may include techniques performed by the system 100 for generating the security profile 114.

At step 402, the system 100 may receive the application data 112 associated with the application 108. The system 100 may receive the application 108 via an upload of the application 108, and extracting the application data 112 from the upload, the system 100 may receive the application data 112 separately from the upload of the application 108 (e.g., via the user input 126 at the UI 124 specifically to create the security profile 114), or combinations thereof. The application data 112 may be received at a server device comprising a processor and memory operated by a same service provider that operates the service provider network 102. The application data 112 may include an application identifier identifying the application 108, information indicating the security posture of the application 108 (e.g., information related to the network security features and/or the one or more hosting sites 104(N) that may host the application 108), and other information related to the application 108. In some instances, the system 100 may receive application data 112 identifying multiple applications 108 that are to be deployed on the service provider network 102.

At step 404, the system 100 (e.g., at the server device of the service provider) may determine security profile data associated with the application 108. For instance, the system 100 may determine that a subset of the data included in the application data 112 is related to the security posture of the application 108 and may determine that this data comprises security profile data on which to base the security profile 114. The security profile data may comprise at least a portion of the application data 112 and/or may partially comprise data received separately from the application data 112 (e.g., via the one or more profile, operations, and/or administrative APIs 132 and/or the UI 124). Any data related to the network security features 106 corresponding to deployment of the application 108 onto the service provider network 102 may be determined to b the security profile data.

At step 406, the system 100 may generate the security profile 114, for instance, based on the security profile data. The system 100 may comprise the security profile generator 116 (e.g., one or more algorithmic or software components of the network onboarding manager 110 and/or the developer portal 130), which may generate the security profile 114, for instance, in response to the user input 126 requesting to generate the security profile 114. The security profile 114 generated by the system 100 may include indications of the network security features 106 (e.g., firewall(s) 134, router(s) 136, load balancer(s) 138, hypervisors, etc.) particular to the application 108 in need of configuring in order to deploy the application 108 on the service provider network 102.

At step 408, the system may store the security profile 114. One or more server devices of the service provider may store one or more security profiles 114 in the security profile database at one or more nodes. For instance, the security profile 114 may be stored at a node of the service provider network in a data interface format comprising at least one of JavaScript Object Notation or Extensible Markup Language.

Figure 5:
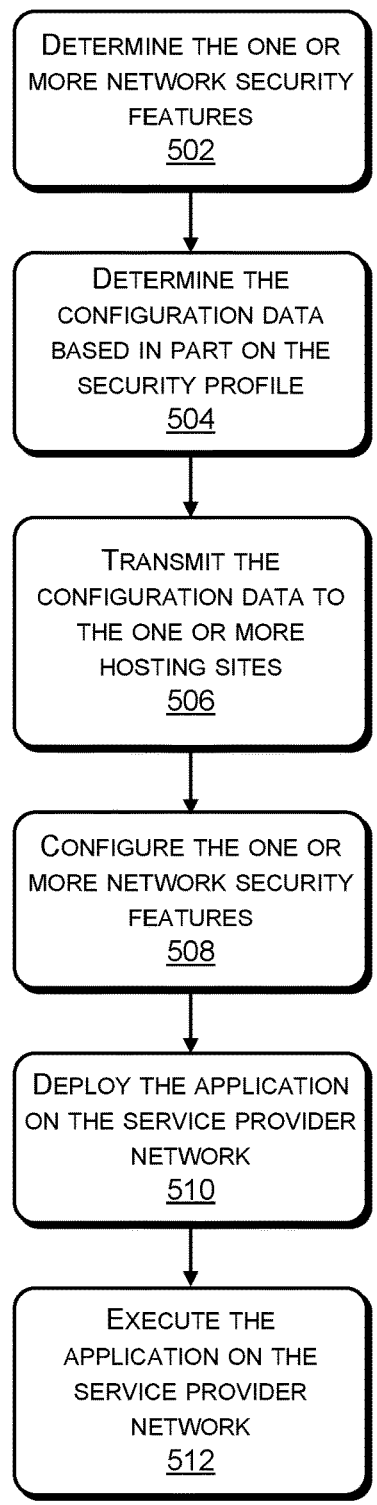
FIG. 5 depicts an example flow diagram illustrating a method for configuring the network security features at the one or more hosting sites based on the security profile, which may be performed by the system(s) discussed herein.

FIG. 5 depicts an example method 500 that may be performed by any of the systems discussed herein, although system 100 is discussed by way example merely for convenience. The method 500 may include techniques performed by the system 100 for deploying the application 108 on the service provider network 102, for instance, by configuring the network security features 106 at the one or more hosting sites 104(N).

At step 502, the system 100 may determine the one or more network security features 106 at the one or more hosting sites 104(N). For instance, the security profile deployer 120 of the network onboarding manager 110 may read the security profile 114 to identify the one or more hosting sites 104(N) and/or the one more network security features 106, for instance, based on the hosting site identifiers 214 and/or indications of the security network features 106 included in the security profile 114. In some examples, the security profile deployer 120 may determine the one or more security features 106 in response to the user input 126 at the UI 124, and may display the determined network security features 106, and/or the security profile deployer 120 may determine the network security features 106 automatically, in response to an API call. Step 502 may comprise determining a first set of network security features 106 at the first hosting site 104(1), second set of network security features 106 at the second hosting site 104(2), a third set of network security features 106 at the third hosting site 104(3), etc. for N hosting sites 104(N). Any one or more of the sets of network security features 106 may comprise a different or unique combination of the network security features 106 discussed herein.

At step 504, the system 100 may determine the configuration data 118, for instance, included in or based on the security profile 114 and/or the hosting site identifiers 214 (which may be included in the security profile 114). In some instances, the security profile deployer 120 may receive information from the one or more hosting sites 104(N), such as one or more security feature lists indicating the network security features 106 at the one or more hosting sites 104(N). The system 100 may send a request for the one or more security features lists to the one or more hosting sites 104(N) and may receive the one or more security feature lists in response. The request may be formatted with a hosting site identifier 214 (which may be determined from the security profile 114) as a destination address. The configuration data 118 may be generated to correspond to the network security features 106 and may comprise one or more values or parameter settings to be applied to the network security features 106 as part of a configuration process, for instance, to deploy the application 108 onto the service provider network 102. The security profile deployer 120 may send first configuration data 118 (e.g., included in the security profile 114) for the first set of network security features 106 at the first hosting site 104(1), second configuration data 118 (e.g., included in the security profile 114 or another security profile) for the second set of network security features 106 at the second hosting site 104(2), third configuration data 118 (e.g., included in the security profile 114 or another security profile) for the third set of network security features 106 at the third hosting site 104(3), etc. for any number of N hosting sites 104(N). The configuration data 118 may be particularized for the hosting site 104 to which it is sent. As such, the configuration data 118 may comprise a different or unique set of values and parameters for configuring the network security features 106 at the particular hosting site 104.

At step 506, the system 100 may transmit the configuration data 118 to the one or more hosting sites 104(N) to configure the network security features 106 at the one or more hosting sites 104(N). For instance, the security profile deployer 120 may deploy the security profile 114 to the one or more hosting sites 104(N), and the security profile 114 may include the configuration data 118. The security profile deployer 120 may format the security profile 114 and/or the configuration data 118 into a data packet to be sent via a wireless transmission from a network node or server device of the service provider to the one or more hosting sites 104(N). For instance, the security profile deployer may transmit the security profile and/or configuration data 118 via a cellular network, such as a 4G network, a 5G network, or an LTE network, and/or via a Wi-Fi network, a Bluetooth® network, a data network, a Wide Area Network (WAN), and/or a Local Area Network (LAN). In some examples, the system 100 may send the first configuration data 118 to the first hosting site 104(1), the second configuration data 118 to the second hosting site 104(2), the third configuration data 118 to the third hosting site 104(3), etc. The first, second, and/or third configuration data 118 may be included in a same security profile 114 and/or in multiple security profiles 114. The system 100 may deploy the security profile 114 to transmit the configuration data 118 based at least in part on a configuration schedule. The configuration schedule may be determined based on the security profile 114 (e.g. a deployment schedule or an update schedule associated with the application 108) and/or other components of the system 100 (e.g., indications received from traffic managers, load balancer(s) 138, etc.) The system 100 may receive a confirmation message from the one or more hosting sites 104(N) indicating that the security profile 114 has been successfully deployed, and/or the configuration data 118 has been successfully received, stored, and/or executed at the one or more hosting sites 104(N). The system 100 may receive an error message from the one or more hosting sites 104(N) indicating that the configuration data 118 has not been successfully received, stored, and/or executed at the one or more hosting sites 104(N).

At step 508, the system may configure the one or more network security features 106 at the one or more hosting sites 104(N), for instance, based on the configuration data 118 included in the security profile 114. A computing device or server device of the one or more hosting sites 104(N) may determine one or more values or parameter settings in the configuration data 118, determine the network security features 106 corresponding to the values or parameter settings, and cause the one or more hosting sites 104(N) to store and/or execute the values or parameter settings, for instance, by APIs of the network security features 106. In some examples, the system 100 may receive a confirmation message from the one or more hosting sites 104(N) indicating that the one or more network security features have been successfully configured according to the configuration data 118. The system 100 may receive an error message from the one or more hosting sites 104(N) indicating that the one or more network security features have not been successfully configured according to the configuration data 118.

At step 510 the system 100 may deploy the application 108 on the service provider network 102. For instance, the application deployer 122 may transmit one or more instances of the application 108 to the one or more hosting sites 104(N), which may store and/or execute the instances at computing devices of the one or more hosting sites 104(N). In some examples, the system 100 may receive a confirmation message from the one or more hosting sites 104(N) indicating that the one or more instances of the application 108 have been successfully received or stored at the one or more hosting sites 104(N). The system 100 may receive an error message from the one or more hosting sites 104(N) indicating that an instance of the application 108 has not been successfully received or stored at the one or more hosting sites 104(N).

Further at step 510, in some instances, the system 100 may configure a virtual security layer and/or a physical security layer. The virtual security layer may comprise the Hypervisor which may communicate with and/or control a virtual switch, a virtual firewall, the load balancer as a service (LBaaS) (e.g., the load balancer(s) 138), and/or a Virtual Machine Host. The Hypervisor may be in communication with a network management API (e.g., Gigamon) and/or a switching system (e.g., Border Leaf). The physical security layer may comprise one or more components in communication with the network management API and/or the switching system, such as a firewall Intrusion Protection System/Intrusion Detection System (IPS/IDS), the load balancer(s) 138, a discontinuous reception (DRx) node, and/or a host. Any of these components may receive and/or be configured by the configuration data 118 at step 510. In some instances, both the physical security layer and the virtual security layer may be configured by the configuration data 118 at a same time, and/or at different times, for instance, based on the configuration schedule.

At step 512 the system may execute the application 108 on the service provider network 102, for instance, to provide one or more services on the service provider network 102. The one or more services may comprise a messaging service, a data service, a voice service, and/or an updated version of one of the aforementioned services. The system 100 may receive a confirmation message from the one or more hosting sites 104(N) indicating that the application 108 has successfully executed at the one or more hosting sites 104(N). The system 100 may receive an error message from the one or more hosting sites 104(N) indicating that the application 108 has not successfully executed at the one or more hosting sites 104(N). In some examples, the network onboarding manager 110 may receive and/or store other information (e.g., from APIs executing the application 108 at the one or more hosting sites 104(N)) associated with the application 108, so that activity of the application 108 (e.g., performance, usage rates, etc.) can be monitored and archived.

Although FIGS. 4 and 5 illustrates example operations, the described operations in these figures (and all other methods and operations disclosed herein) may be performed in other orders different than those illustrated in FIGS. 4 and 5 and multiple steps may be performed simultaneously or in parallel. Furthermore, in some embodiments, one or more operations illustrated in FIGS. 4 and 5 may be omitted, repeated, and/or combined with other operations illustrated in FIGS. 4 and 5, or any other operations and components discussed in this disclosure. In some instances, any of steps 402-408 or 502-512 may be performed at least partly in response to any of steps 402-408 or 502-512. In some instances, the operations illustrated in FIGS. 4 and 5 may be performed in multiple iterations for instance, to generate, manage and/or configure thousands, or even millions of hosting sites 104, network security features 106, applications 108, and/or security profiles 114 around the world.

Conclusion

Although this disclosure uses language specific to structural features and/or methodological acts, it is to be understood that the scope of the disclosure is not necessarily limited to the specific features or acts described. Rather, the specific features and acts are disclosed as illustrative forms of implementation.

What is claimed is:

1. A system comprising:
   one or more processors;
   one or more non-transitory storage media; and
   computer-readable instructions stored in the non-transitory storage media that, when executed by the one or more processors, cause the one or more processors to perform operations comprising:
     receiving, at a server device of a service provider, application data that identifies one or more applications;
     determining, at the server device, security profile data associated with the application data;
     generating, based at least in part on the security profile data, a security profile;
     determining, based at least in part on the security profile, one or more network security features at one or more hosting sites of a service provider network operated by the service provider;
     determining, based at least in part on the security profile and the one or more network security features, configuration data for the one more network security features; and
     transmitting, based at least in part on the application data, the configuration data to the one or more hosting sites to configure the one or more network security features at the one or more hosting sites.

2. The system of claim 1, further comprising receiving a security feature list associated with a particular hosting site of the one or more hosting sites;
   wherein determining the configuration data is based at least in part on the security feature list.

3. The system of claim 2, further comprising:
   determining, based at least in part on the application data, one or more hosting site identifiers; and
   sending, to the particular hosting site and based at least in part on the one or more hosting site identifiers, a request for the security feature list, wherein receiving the security feature list is responsive to the request.

4. The system of claim 1, further comprising receiving, from the one or more hosting sites, a confirmation that the one or more hosting sites have configured the one or more network security features according to the configuration data.

5. The system of claim 1, wherein the one or more network security features comprise one or more of:
   a proxy system;
   a firewall system;
   a load balancing system;
   a domain name system;
   a dynamic host configuration protocol;
   an internet protocol address management system;
   a hypervisor; or
   a virtual local area network.

6. The system of claim 1, further comprising:
   determining, based at least in part on the security profile and the one or more network security features, a configuration schedule associated with the one or more network security features;
   wherein transmitting the configuration data is further based at least in part on the configuration schedule.

7. The system of claim 1, wherein the security profile is stored on the service provider network in a format comprising at least one of JavaScript Object Notation or Extensible Markup Language.

8. The system of claim 1, the operations further comprising:
   generating a user interface (UI) accessible via a developer portal of the service provider;
   receiving a user input at the UI;
   wherein determining the security profile data is based at least in part on the user input.

9. A computer-implemented method comprising:
   receiving application data that identifies one or more applications;
   determining security profile data associated with the application data;
   generating, based at least in part on the security profile data, a security profile;
   determining one or more hosting site identifiers corresponding to one or more hosting sites based at least in part on the application data;
   determining, based at least in part on the security profile and the one or more hosting site identifiers, one or more network security features;
   determining, based at least in part on the security profile and the one or more network security features, configuration data for the one or more network security features; and
   transmitting, based at least in part on the one or more hosting site identifiers, the configuration data to the one or more hosting sites to configure the one or more network security features at the one or more hosting sites.

10. The computer-implemented method of claim 9, further comprising receiving a security feature list associated with a particular hosting site of the one or more hosting sites;
    wherein determining the configuration data is based at least in part on the security feature list.

11. The computer-implemented method of claim 9, further comprising receiving, from the one or more hosting sites, a confirmation that the one or more hosting sites have configured the one or more network security features according to the configuration data.

12. The computer-implemented method of claim 9, wherein the one or more network security features comprise one or more of:
    a proxy system;

a firewall system;
a load balancing system;
a domain name system;
a dynamic host configuration protocol;
an internet protocol address management system;
a hypervisor; or
a virtual local area network.

13. The computer-implemented method of claim 9, wherein the security profile is stored at a node of the service provider network in a data interface format comprising at least one of JavaScript Object Notation or Extensible Markup Language.

14. The computer-implemented method of claim 9, further comprising:
determining, based at least in part on the security profile and the one or more network security features, a configuration schedule associated with the one or more network security features;
wherein transmitting the configuration data is based at least in part on the configuration schedule.

15. A computer-implemented method comprising:
receiving application data that identifies one or more applications;
determining security profile data associated with the application data;
generating, based at least in part on the security profile data, a security profile;
determining a plurality of hosting site identifiers corresponding to a plurality of hosting sites based at least in part on the application data;
determining, based at least in part on the security profile and the plurality of hosting site identifiers, a first network security feature corresponding to a first hosting site of the plurality of hosting sites;
determining, based at least in part on the security profile and the plurality of hosting site identifiers, a second network security feature corresponding to a second hosting site of the plurality of hosting sites, the second network feature being a different network security feature than the first network security feature;
determining, based at least in part on the security profile and the first network security feature, first configuration data;
determining, based at least in part on the security profile and the second network security feature, second configuration data; and
transmitting, based at least in part on the plurality of hosting site identifiers:
the first configuration data to the first hosting site to configure the first network security feature at the first hosting site; and
the second configuration data to the second hosting site to configure the second network security feature at the second hosting site.

16. The computer-implemented method of claim 15, further comprising receiving an indication of the first network security feature associated with the first hosting site;
wherein determining the first configuration data is based at least in part on the first security feature list.

17. The computer-implemented method of claim 15, further comprising receiving, from the first hosting site, a confirmation that the first hosting site has configured the first one or more network security features according to the configuration data.

18. The computer-implemented method of claim 15, wherein the one or more first network security features and the one or e more second network security features comprise one or more of:
a proxy system;
a firewall system;
a load balancing system;
a domain name system;
a dynamic host configuration protocol;
an internet protocol address management system;
a hypervisor; or
a virtual local area network.

19. The computer-implemented method of claim 15, wherein the security profile is stored at a node of the service provider network in a data interface format comprising at least one of JavaScript Object Notation or Extensible Markup Language.

20. The computer-implemented method of claim 15, further comprising:
determining, based at least in part on the security profile and the one or more first network security features, a first configuration schedule associated with the one or more first network security features;
determining, based at least in part on the security profile and the one or more second network security features, a second configuration schedule associated with the one or more second network security features, the second configuration schedule being a different schedule than the first configuration schedule;
wherein transmitting the first configuration data is based at least in part on the configuration schedule.

* * * * *